(12) United States Patent
Hii

(10) Patent No.: US 6,515,664 B1
(45) Date of Patent: Feb. 4, 2003

(54) FAST SINGLE-PASS CYLINDRICAL TO PLANAR PROJECTION

(75) Inventor: Toh Ann Desmond Hii, Singapore (SG)

(73) Assignee: Pixaround.com Pte Ltd (SI)

( * ) Notice: Subject to any disclaimer, the term of this patent is extended or adjusted under 35 U.S.C. 154(b) by 0 days.

(21) Appl. No.: 09/439,942

(22) Filed: Nov. 12, 1999

(51) Int. Cl.⁷ .............................................. G06T 17/00
(52) U.S. Cl. ....................................................... 345/427
(58) Field of Search ................................ 345/416, 419, 345/422, 427

(56) References Cited

U.S. PATENT DOCUMENTS

| | | | |
|---|---|---|---|
| 4,692,878 A | 9/1987 | Ciongoli | 364/518 |
| 5,228,119 A | 7/1993 | Mihalisin et al. | 395/118 |
| 5,282,262 A | 1/1994 | Kurashige | 395/126 |
| 5,384,580 A | 1/1995 | Kadota | 345/145 |
| 5,396,583 A | 3/1995 | Chen et al. | 395/127 |
| 5,414,803 A | 5/1995 | Malzbender | 395/127 |
| 5,561,723 A | 10/1996 | DesJardins et al. | 382/260 |
| 5,608,855 A | 3/1997 | Harashima | 395/142 |
| 5,745,665 A | 4/1998 | Pasco | 395/127 |
| 5,748,192 A | 5/1998 | Lindholm | 345/425 |
| 5,748,194 A | 5/1998 | Chen | 345/427 |
| 5,751,927 A | 5/1998 | Wason | 395/119 |
| 5,877,768 A | 3/1999 | Jain | 345/421 |
| 5,912,670 A | 6/1999 | Lipscomb et al. | 345/419 |
| 5,929,861 A | 7/1999 | Small | 345/427 |
| 5,940,079 A | 8/1999 | Morino et al. | 345/430 |

Primary Examiner—Cliff N. Vo
(74) Attorney, Agent, or Firm—Townsend and Townsend and Crew LLP

(57) ABSTRACT

A single-pass method which is an inverse mapping technique that map an image expressed in cylindrical coordinates to a viewing plane. In accordance with this method, a cylindrical environment map is also used to express a scene. However, rather than projecting the image in cylindrical coordinates out onto the viewing plane, the pixels on the viewing plane are ray-traced, in scan-line order, back through the cylinder to determine the corresponding points of intersection on the cylinder. The intersecting rays form a "clam-shell" like sampling region on the cylinder, and the corresponding output pixel values for the points of intersection on the cylinder are copied to the corresponding output pixel. No other perspective adjustment or scaling factors are necessary. Also, no intermediate data buffer is necessary. Computations are minimized by mapping the top and bottom borders of the viewing plane to the cylinder to determine the top and bottom arcs of the clam-like shaped sampling region on the cylinder and then, for each pair of values in each array, interpolating vertically to get the rest of the sample points on the cylinder.

10 Claims, 8 Drawing Sheets

Boundary condition case 1

Boundary condition case 2

|  |  | Plain Vanilla Rendering | | Chunk Rendering | |
|---|---|---|---|---|---|
| Width height |  | Frames/sec | Cost per Pixel (ns) | FPS | Cost per Pixel (ns) |
| 300 | 400 | Total Pixel (width * height) 120000 | 166.6666667 | 50 | 166.6666667 |
| 640 | 480 | 307200 | 217.0138889 | 21 | 155.0099206 |
| 800 | 600 | 480000 | 260.4166667 | 14 | 148.8095238 |
| 1024 | 768 | 786432 | 317.8914388 | 9 | 141.2850839 |

FAST SINGLE-PASS CYLINDRICAL TO PLANAR PROJECTION

BACKGROUND OF THE INVENTION

The present invention relates to image mapping, and in particular mapping an image expressed in cylindrical coordinates to a rectangular viewing plane.

A good description of prior art rendering techniques can be found in the Chen patent (U.S. Pat. No. 5,396,583), assigned to Apple Computer, Inc. The Chen patent describes a method of mapping an image expressed in cylindrical coordinates to a viewing plane. Chen uses a forward mapping technique to perform a spatial transformation on each input pixel expressed in cylindrical coordinates such that it is expressed in the planar coordinates of the viewing plane. In accordance with this method, a cylindrical environment map is used to express a scene (i.e., the input image data is expressed in cylindrical coordinates). The perspective adjusted projection of the cylindrical data onto the viewing plane is determined by multiplying the input pixel values by scaling factors which adjust for the differences in distance from the center of the cylinder to the input pixel's location on the cylinder. In other words, the further the pixel is from the center of the viewing plane along the horizontal, the more perspective adjustment is necessary, and the further the pixel is from the vertical center of the cylinder, the more perspective adjustment is necessary.

Movement of the viewing plane around the cylinder is accomplished by performing a two-pass cylindrical to planar projection. Horizontal rotation around the center axis of the cylinder is calculated in the first pass, while vertical rotation up and down the cylinder is calculated in the second pass. In the first pass, the horizontal rotation is accounted for by mapping the cylinder to a vertical plane using scaling factors (rcos(u)/d) stored in a look-up table. These scaling factors provide the horizontal perspective adjustment. Once the horizontal translation and perspective adjustment is calculated and the results stored in a buffer, the vertical rotation is determined by mapping the vertical plane to the rotated viewing plane using a uniform scaling of data for each horizontal scan-line. A different scaling factor is computed for perspective adjustment in the vertical direction by multiplying the y-coordinates of the viewing plane with the v-value stored in a look-up table. In a preferred embodiment, a look-up table for non-uniform vertical increments is computed and used during the first mapping to decide which horizontal scan-lines to create for the vertical plane. This approach creates non-uniformly distributed scan-lines on the vertical plane which map to uniformly distributed scan-lines on the viewing plane as a simple scaling of each horizontal scan-line.

The Chen patent shows a forward mapping technique in which the cylindrical coordinate data is mapped to the viewing plane using a plurality of scaling factors, first for horizontal, and then for vertical displacement. In other words, the input pixel values in cylindrical coordinates are mapped to a translated viewing place with perspective correction performed by calculated scaling factors. Since the vertical displacement is calculated from the horizontally displaced data points, the results of the horizontal displacement are buffered in an intermediate buffer during the first pass and then used during the second pass to map to the vertically displaced viewing plane.

SUMMARY OF THE INVENTION

The present invention provides a single-pass method which is an inverse mapping technique that maps an image expressed in cylindrical coordinates to a viewing plane. In accordance with this method, a cylindrical environment map is also used to express a scene. However, rather than projecting the image in cylindrical coordinates out onto the viewing plane, the pixels on the viewing plane are ray-traced, in scan-line order, back through the cylinder to determine the corresponding points of intersection on the cylinder. The intersecting rays form a "clam-shell" like sampling region on the cylinder, and the corresponding output pixel values for the points of intersection on the cylinder are copied to the corresponding output pixel. No other perspective adjustment or scaling factors are necessary. Also, no intermediate data buffer is necessary.

Normally, a ray-tracing approach of this type is computationally intensive. However, computations are minimized by mapping the top and bottom borders of the viewing plane to the cylinder to determine the top and bottom arcs of the clam-like shaped sampling region on the cylinder and then, for each pair of values in each array, interpolating vertically to get the rest of the sample points on the cylinder. Additional arcs between the top and bottom arcs of the sampling region may be calculated as desired to minimize projection error.

For a further understanding of the nature and advantages of the invention, reference should be made to the following description taken in conjunction with the accompanying drawings.

DETAILED DESCRIPTION

Figure 1:
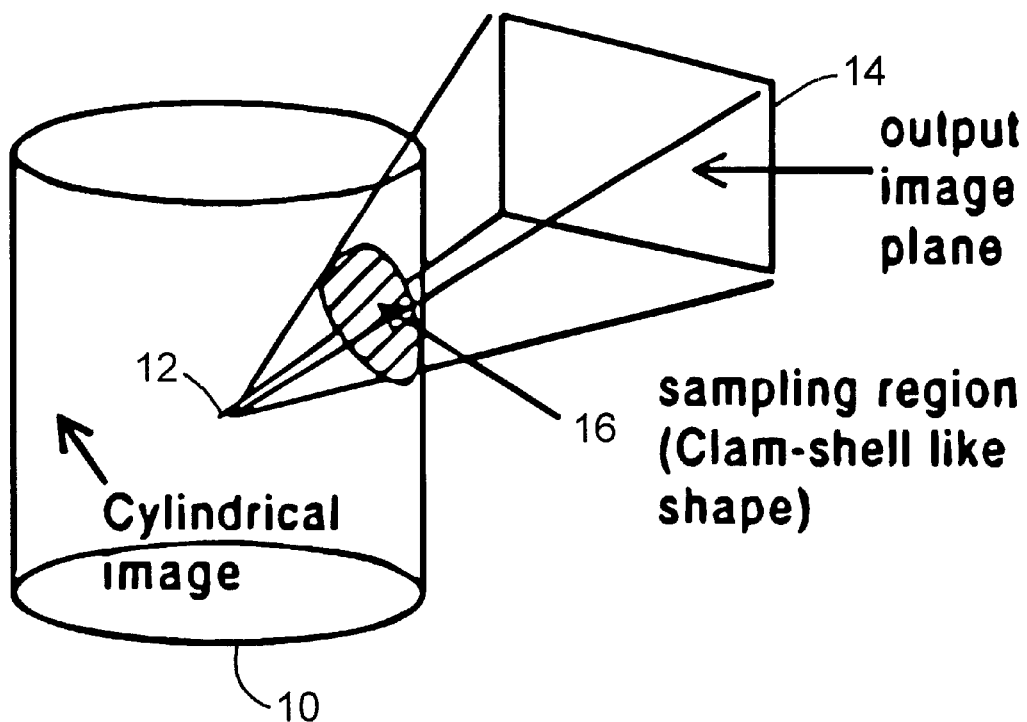
FIG. 1 is a diagram illustrating the planar projection of a cylindrical segment.

FIG. 1 shows a cylindrical image 10. This image is stored in computer memory, and may be generated by any number of methods. The image can be entirely computer generated, or it could be taken from a series of photographs, such as from multiple cameras or a rotating video camera. A viewer of the computer screen may desire to view a portion of the cylindrical image, such as a viewer in a game looking in a particular direction. The cylindrical image may show the environment of the user at that point in the game. By ray tracing from a center point 12, a rectangular output image 14 can be obtained which intersects with the cylinder in a region 16, which is clam-shell shaped. Alternately, image plane 14 may be inside of the cylinder, between point 12 and cylindrical intersection region 16.

Figure 2:
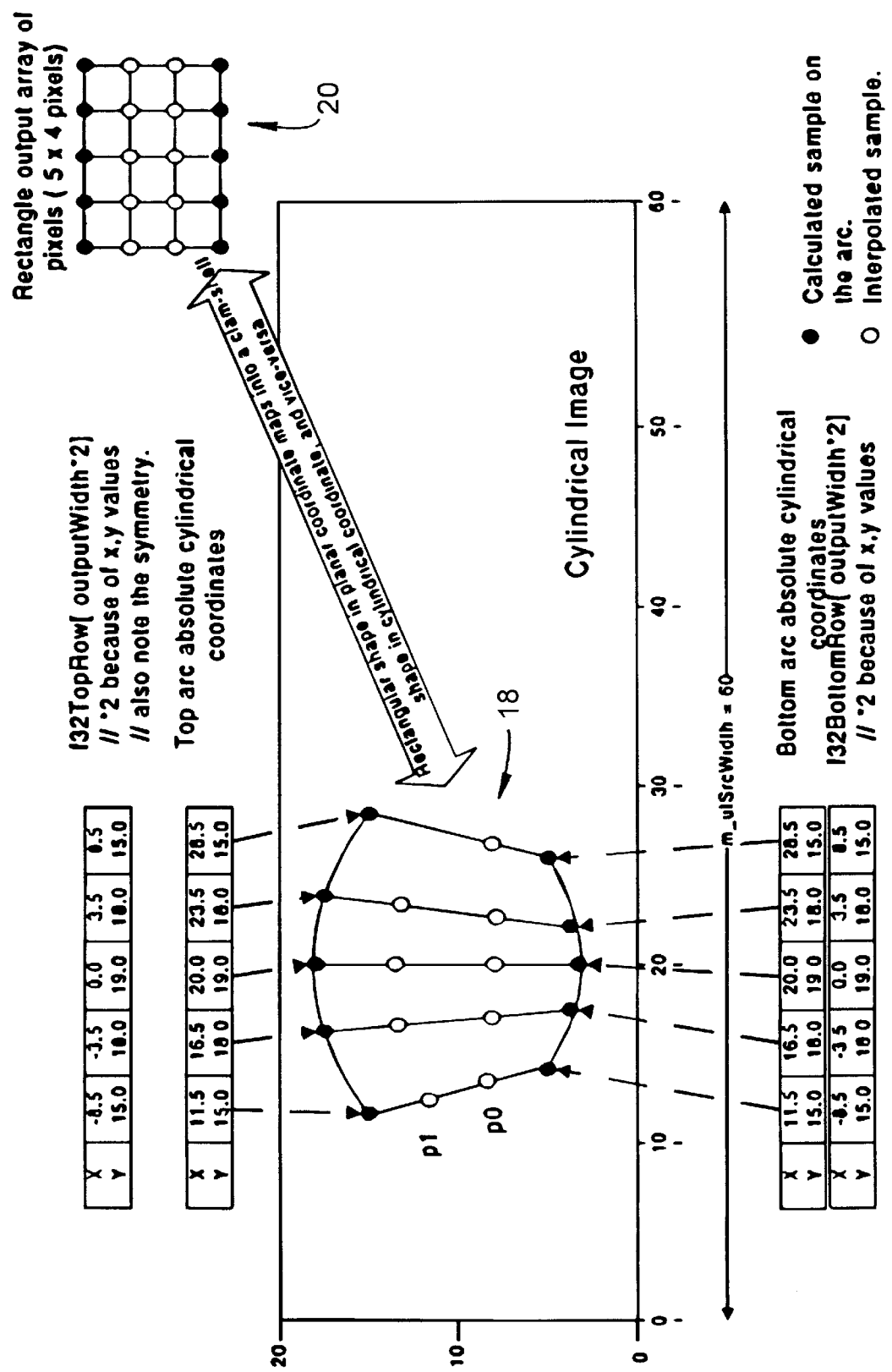
FIG. 2 is a diagram illustrating the relationship between a cylindrical segment and a plane.

A planar rectangle maps into a clam-shell shaped sampling region in cylindrical space (FIGS. 1 and 2). If we disallow camera roll, allowing only yawing and pitching, the sampling region is symmetrical along its middle vertical line. FIG. 2 shows an example of an unrolled cylindrical image 18 which is 60 pixels wide and 20 pixels high. The output window 20 is 5 pixels by 4 pixels.

The algorithm consists of two steps:
1. Find the top arc 22 and bottom arc 24 of the sample region (clam-like shape). The values are stored in two separate arrays, an array 26 which is f32TopRow and an array 28, which is f32BottomRow; and
2. For each pair of values from each array, we interpolate vertically to get the rest of the sample points, e.g. we interpolate between f32TopRow [0] and f32BottomRow [0] to get the other two sample points p0 and p1.

The interpolation is performed on the cylindrical image to obtain the color values of the pixels at the desired positions. The number of intermediate interpolation sample points depends upon the number of pixels needed for the planar output image desired. The corresponding pixel color values are then stored in the output image ray 20 at corresponding positions.

Linear interpolation is used for performance reasons. However, linear interpolation results in projection error, which is manifested as image squashing during camera pitching. One way to overcome this is to have additional arcs in between the top and bottom arc. The additional arcs are also found by ray tracing. Once the additional arcs are found, interpolation is done between each pair of arcs. Thus, a first set of points is interpolated between the top arc and the next arc down. The next set of points are determined by interpolation between that next arc down, and the following, next lower arc, until the bottom arc is reached.

For each of the interpolation steps, an interpolated point on the cylindrical image may not coincide with a particular pixel. In that event, the color value of the point is determined by interpolation from the nearest surrounding pixels.

Note also that instead of point sampling, better sampling algorithms, like bilinear sampling and even mipmapping can be used to improve the image quality. For these reasons, the points are stored as a real value instead of an integer.

Figure 3:
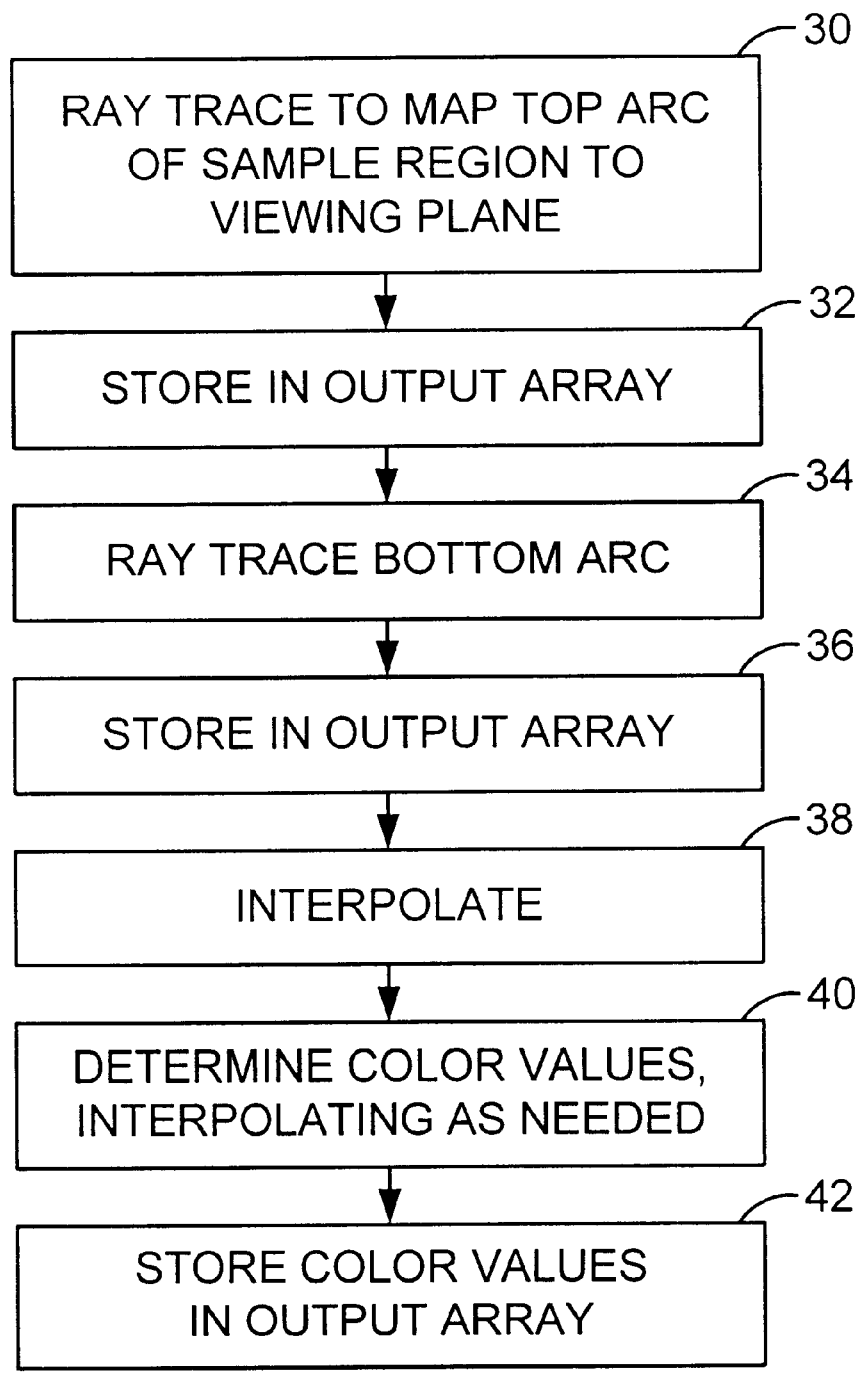
FIG. 3 is a flow chart of a preferred embodiment of the method of the present invention.

FIG. 3 is a flow chart illustrating the operation of the algorithm of the invention. In step 30, the pixels of the top arc of the intersection with the cylindrical image are determined in sequence by ray tracing, as described below. The corresponding color values for those pixels are stored in the output array (step 32). Subsequently, the bottom arc is determined by ray tracing, moving sequentially through each of the pixels of the bottom arc. The color value of each of those pixels is stored in the bottom line of the output array (step 36). The intermediate locations on the cylindrical image corresponding to the intermediate lines in the output image are determined by interpolation (step 38). Next, the color values of the pixels at the interpolated points are determined, using interpolation on the cylindrical image where necessary. Finally, the color values of the interpolated points are stored in the output array (step 42).

The goal in finding the arc is to fill the two arrays f32TopRow [ ] and f32BottomRow [ ] which represent the top and bottom arcs. We are given the following information:

Camera: Horizontal field of view (horizFov), current pan angle (thetaPan), pitch angle (thetaPitch).

Source cylindrical image: Width (srcWidth), height (srcHeight).

Figure 4A:
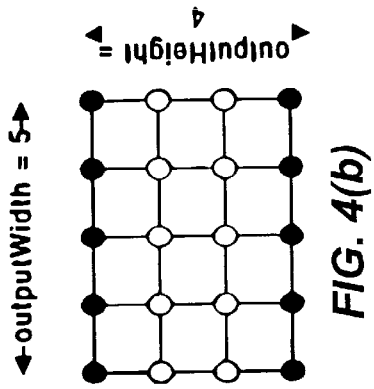
FIGS. 4A–C are diagrams illustrating the ray-trace mapping of the top and bottom arcs.
Figure 4B:
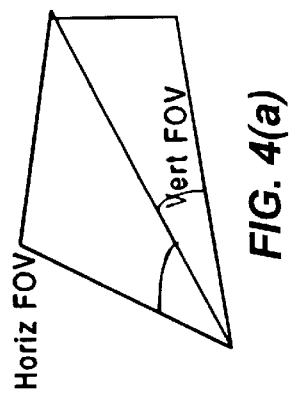
Figure 4C:
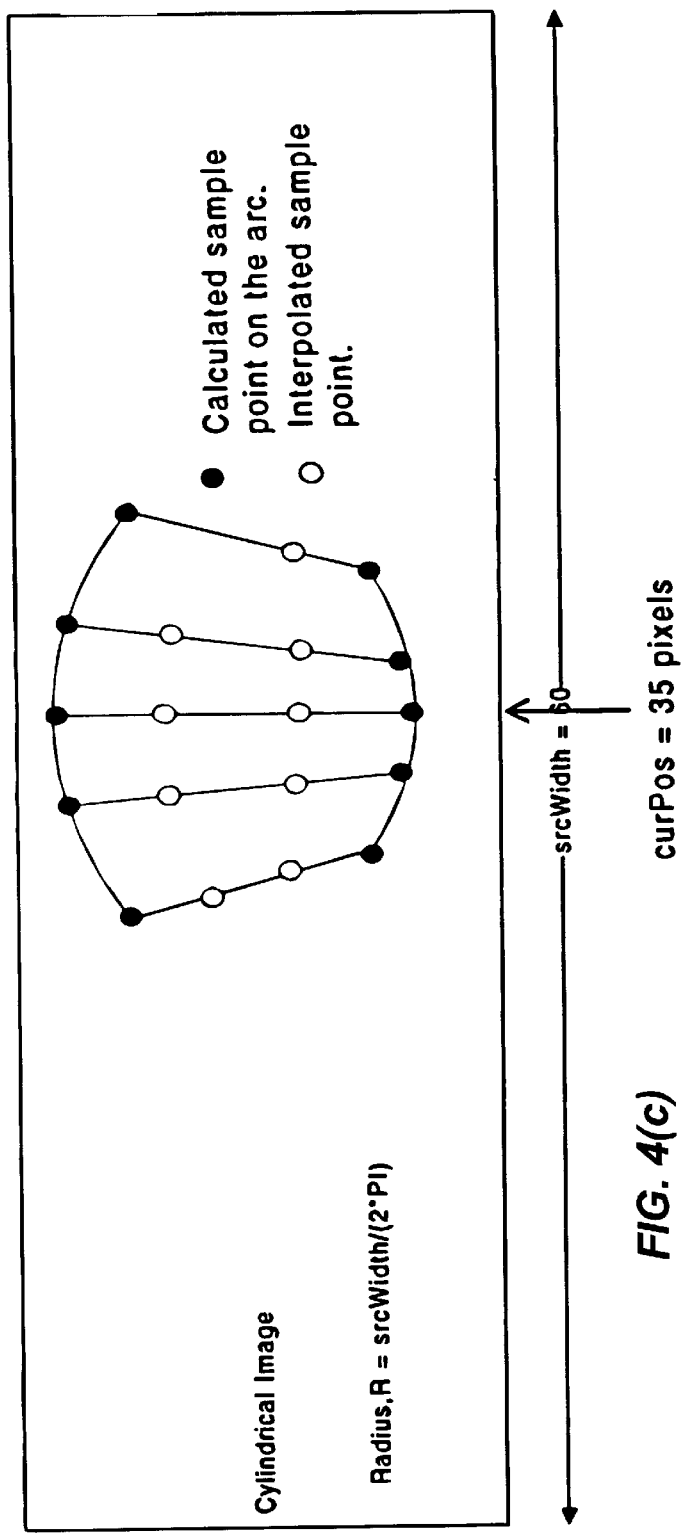

FIG. 4a shows the given view pyramid, FIG. 4b shows the output pixels, and FIG. 4c shows the cylindrical image with a projected rectangle, in the shape of a clam shell.

Derived variables:

$$\text{Vertical Field of View, } VertFOV \frac{outputHeight/2}{\left(\frac{outputwidth/2}{\tan(horizFOV/2)}\right)}$$

curPos=srcWidth/(thetaPan/(2*PI))

Case 1

Figure 5:
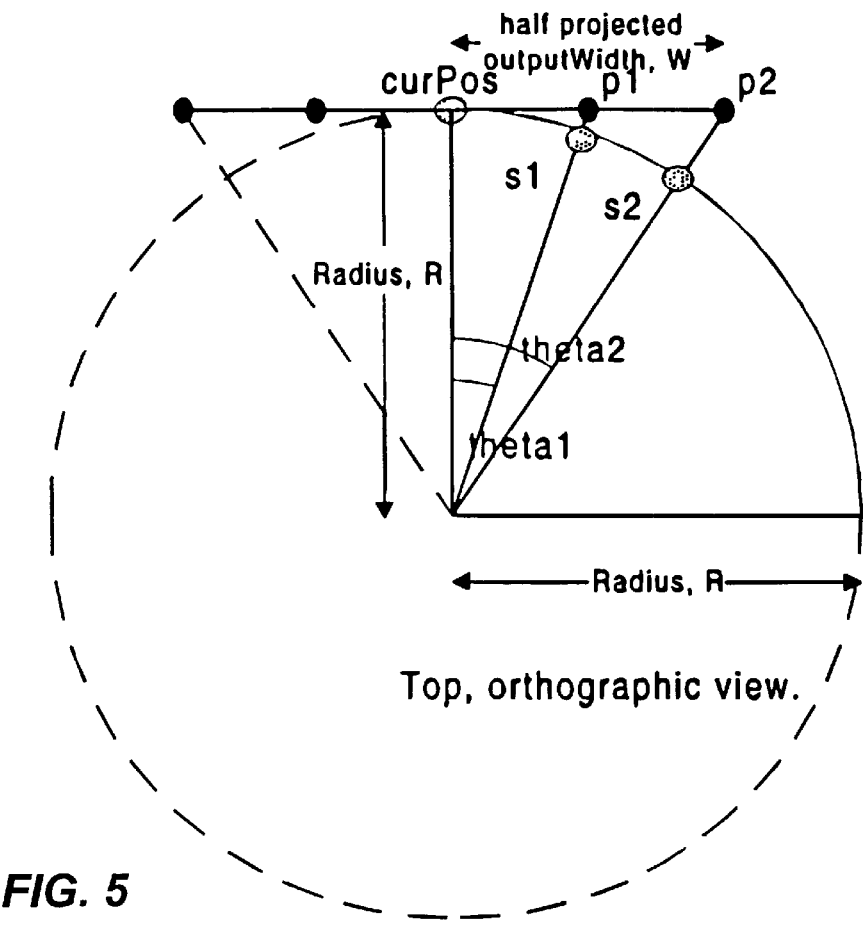
FIG. 5 is a diagram illustrating the top view of a cylindrical segment to planar projection.

We will start with a simple case, where there is no pitching and assume that the projection plane touches the cylinder, as illustrated in FIG. 5. Because of symmetry, we show only half the viewing pyramid. FIG. 4 shows the top view of a viewing pyramid and the cylinders s1 and s2 are in cylindrical coordinates.

Our goal is to obtain the sample points s1 and s2 corresponding to the two planar pixels p1 and p2.

Given half projected width, W:

For odd number output window width, dW=W/(floor (outputWidth/2))

For even number output window width, dW=W/ (outputWidth/2)

To find theta:

theta1=atan((offset+(1*dW))/Radius)radian theta2=atan((offset+(2*dW))/Radius)radian We give two examples above of finding thetas. During implementation, this occurs in a loop for each output sample point along the arc.

Cylindrical pixels per radian:

PixelsPerRadian=srcWidth/(2*PI)=Radius!

Finally, the absolute location in cylindrical space:

s1.x=theta1*PixelsPerRadian=curPos.

Note that the projection region is centered at curPos.

Case 2 below shows how to determine s.y.

Case 2

Figure 6:
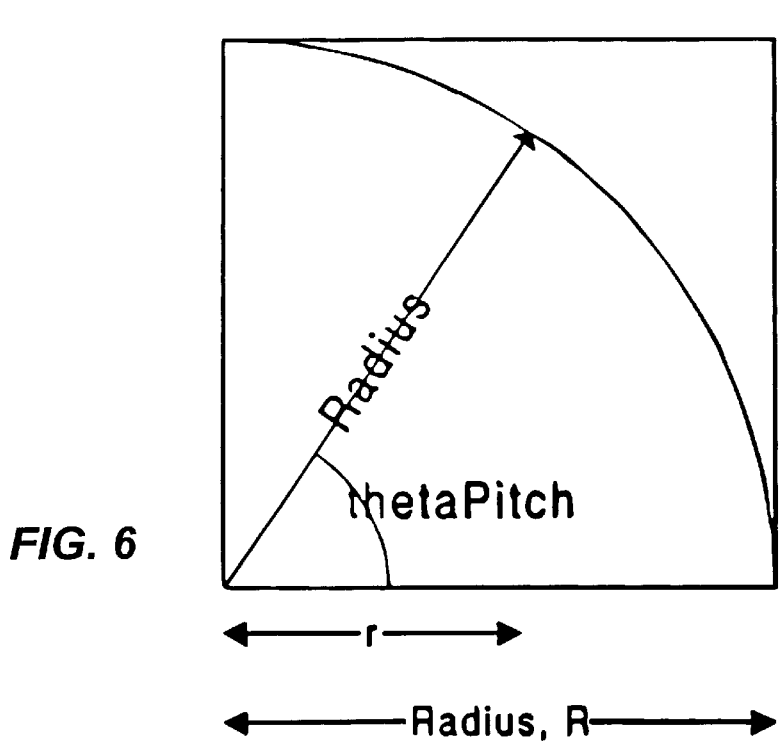
FIG. 6 is a side view illustrating the effective radius for a given pitch.
Figure 7:
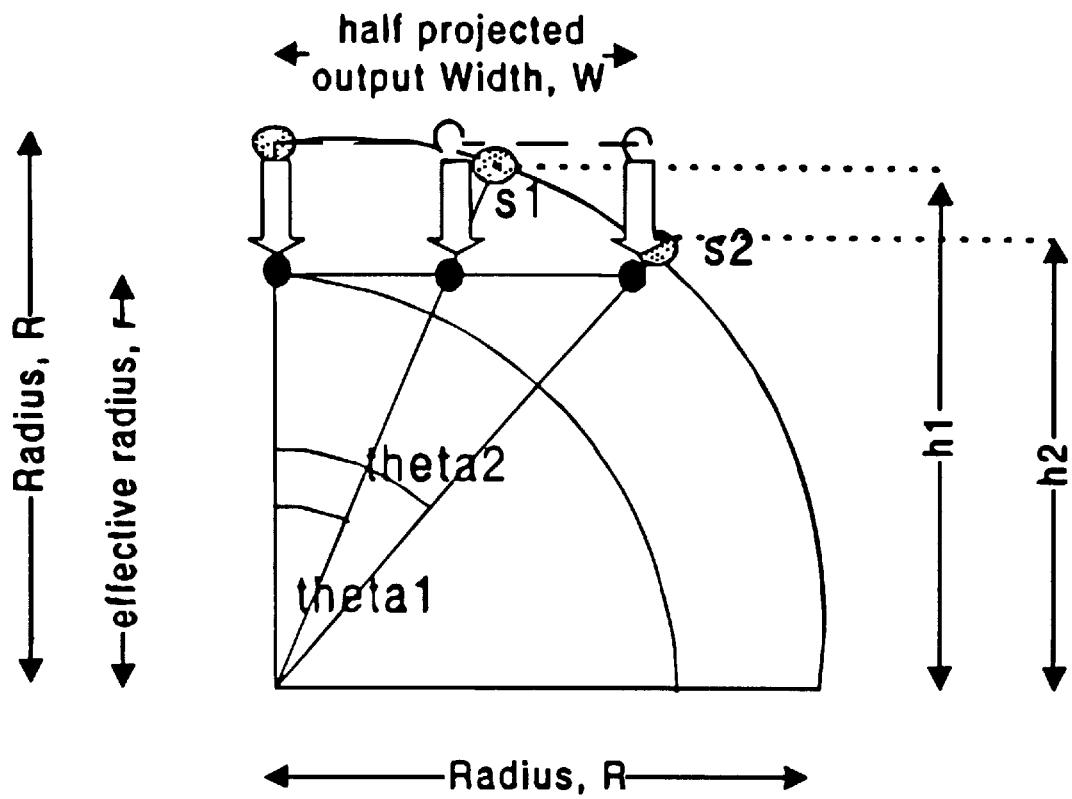
FIG. 7 is a diagram illustrating an orthographic view from the top showing a quarter cylinder projection.

When pitching up or down, the line representing the plane actually moves towards the center of the cylinder, resulting in a wider field of view. FIGS. 6 and 7 illustrate this phenomena as the camera pitches by thetaPitch. FIG. 6 shows a side view, getting the effective radius r, given thetaPitch. FIG. 7 shows a top orthographic view, only showing the quarter cylinder.

The effective radius r is now r=Rcos(thetaPitch). Instead of theta1=atan((offset+(1*dW))/Radius)

We now have theta1=atan((offset+(1*dW))/r).

The remaining calculation is the same as in Case 1. The sole difference between these two cases is that case 1 uses Radius R, while Case 2 used the effective radius r (r<=R).

Cylindrical pixels per radian:

PixelsPerRadian=srcWidth/(2 *PI)=Radius s1.x=curPos=theta1*pixelsPerRadian

To get s1.y and s2.y, referring to FIG. 6, h1=R*cos (theta1).

Figure 8:
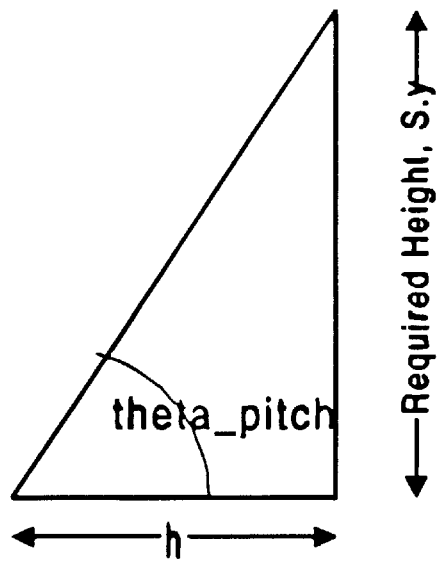
FIG. 8 is a diagram showing a side, orthographic view of the theta pitch angle.

Finally, referring to FIG. 8, s1.y=h1*tan(theta1Pitch)+ (srcHeight/2).

Again, we add (srcHeight/2) because the origin of the projection is at the center of the cylinder, and s1.y is an absolute coordinate with respect to an image, whose origin is at the bottom left.

Handling Boundary Conditions During Interpolation

Figure 9:
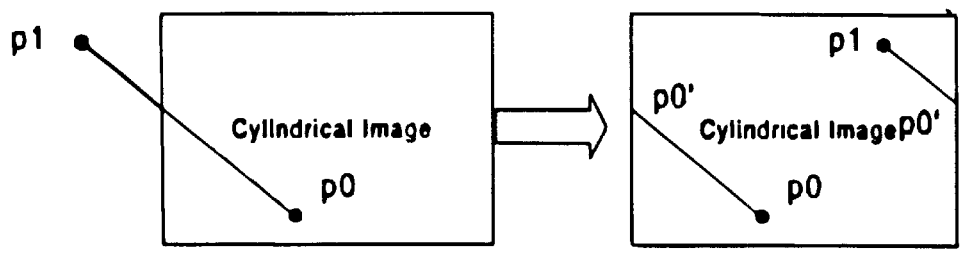
FIG. 9 is a diagram illustrating boundary conditions for interpolation.
Figure 9:
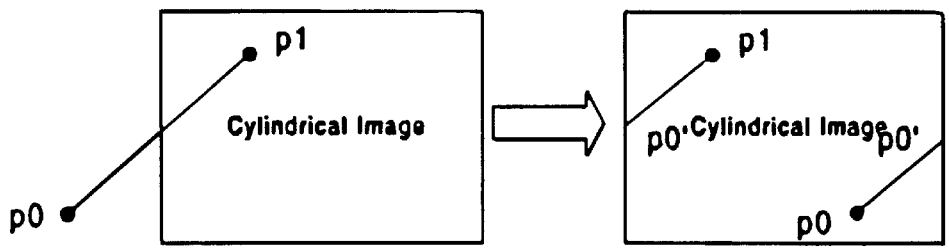

After finding the arcs, we interpolate between them to get the rest of the sample points. Note that two boundary conditions exist during vertical interpolation as illustrated in FIG. 9. We label the two endpoints as p0 and p1, where p0 is from the bottom arc and p1 is from the top arc. We then interpolate from p0 to p1. The solution for both boundary cases is to split the line into two segments. Typically for linear interpolation, we calculate a delta x (dx) and delta y (dy) based on the two end points and the required output height.

dx=(p1.x−p0.x)/outputHeight  dy=(p1.y−p0.y/outputHeight

We start by assigning p=p0.

Due to wraparound, in Case 1, p1 is negative. We move p along the interpolated path until it hits the left boundary of the image (p.x<0). At p0' we then add (srcWidth—1) to move p from the left edge to the right edge of the cylindrical image. Interpolation continues with the same dx and dy.

```
if (f32p1x < 0) {
    while (f32p0x > 0) {
        TRANSFER_PIXEL (pOut, f32p0x, f32p0y);
        f32p0x += f32dx;
        f32p0y += f32dy;
        pByteOut += u1WidthBytes;
        pOut = (DEPTH*) pByteOut;
    }
    f32p0x += f32SrcWidthMinus1;
    go to SCAN_CONVERT;
}
```

Similarly in Case 2, p0 is negative. We start by adding srcWidth to p, this moving it inside the cylindrical image. We then interpolate p until it hits the right edge (p.x>srcWidth), upon which p.x−=srcWidth to move it back to the left edge.

```
if (f32p0x < 0) {
    f32p0x = f32p0x + f32src Width;
    while (f32p0x < f32srcWidth) (
        TRANSFER_PIXEL (pOut, f32p0x, f32p0y);
        f32p0x += f32dx;
        f32p0y += f32dy;
        pByteOut += u1WidthBytes;
        pOut = (DEPTH*) pByteOut;
    )
    f32p0x −= f32SrcWidth;
}
```

Cache Coherency and Chunk Rendering

We will now take a closer look at the memory access pattern illustrated in FIGS. 10(a)–(d). The access pattern has an impact on performance due to caching. Cache misses are computationally costly because the fast CPU will have to wait for data to arrive from the slower RAM. One way of minimizing cache miss is to cluster the information together.

Figure 10:
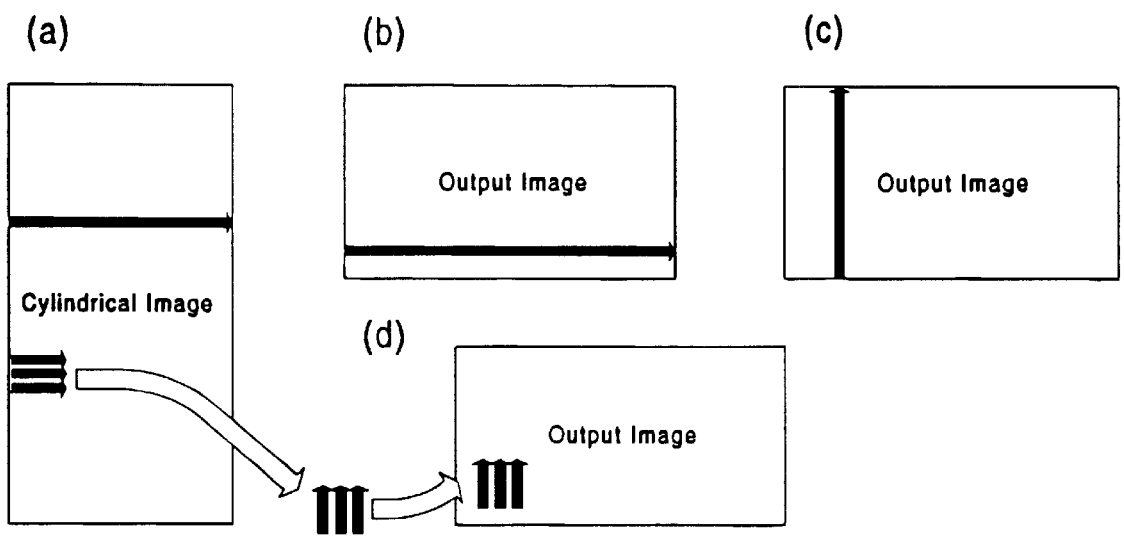
FIG. 10 is a diagram illustrating memory access patterns and cache coherency and chunk rendering.

Typically, the cylindrical image is accessed column by column. In its natural format, it results in numerous cache misses, since the differences in adjacent pixels' addresses are large. The difference between two adjacent pixels in a column is the width of the image. In the worst case, each pixel read results in a cache miss. Thus, the cylindrical image is stored rotated clockwise by 90 degrees as shown in FIG. 10(a). In this case, the difference in address of the adjacent pixel is only 1 unit.

Ideally, the access pattern of the output image should be row-wise as shown in FIG. 10(b). However, since we are interpolating vertically, the access pattern is actually that of FIG. 10(c). Again, the column-wise access is inefficient. The naïve way to rectify this problem is to rotate the output image, process it, and then rotate back. However, these rotations will be costly due to the same cache misses.

We propose the use of an intermediate fixed size cache. In our implementation, we use a 64×64 pixel buffer. We choose 64×64 because the buffer fits nicely into the Pentium cache. The output image is tiled into chunks of 64×64 pixels. We first render the image into the intermediate buffer. Since the entire buffer sits nicely in the cache, the access is very fast. The cache is then moved row by row using DMA bursts to the output image. Since the movement is row by row, cache miss is minimized at the final output image. Cache miss only occurs between successive rows. Thus, the larger the row, the better. The process is called chuck rendering.

Note that the size of the intermediate buffer determines the performance. The larger the size, the more savings for buffer to output image transfer, since each row is now larger. However, the buffer may not fit the cache. Thus, in practice, we choose the largest buffer size that sits nicely in the CPU cache.

Performance Analysis

We analyzed the performance of the algorithm of the invention on an Intel Pentium II 300 Mhz, 64 M.B. RAM, Canopus spectra 2500 (using nVidia TNT chip) running Microsoft's Windows 98. The color depth was 16 bits. We did not use DirectX and relied solely on Windows GDI calls.

Figures 11, 12:
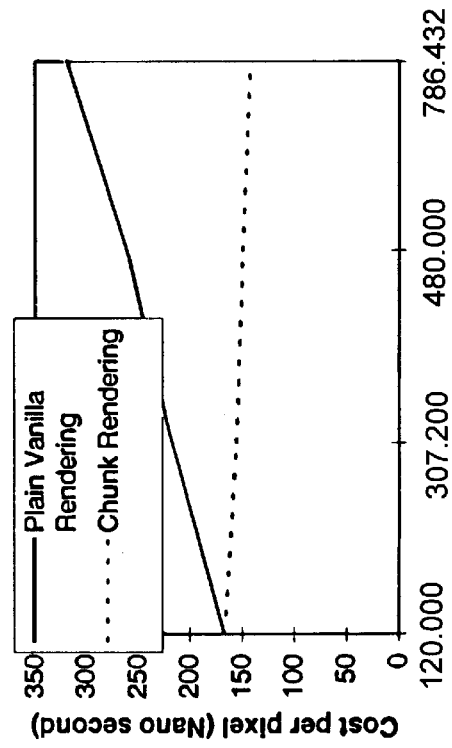
FIG. 11 is a diagram illustrating the cost per pixel using chunk rendering.
FIG. 12 is a diagram showing the cost per pixel versus resolution.

We compared the performance of plain vanilla rendering and chunk rendering. Using plain vanilla rendering, we see that the cost to render a pixel increases with resolution due to cache misses. With chunk rendering, the cost remains relatively constant (FIG. 11). FIG. 12 shows the cost per pixel versus resolution.

The present invention provides a fast one-pass algorithm to project a cylindrical segment onto a viewing plane of a camera as it pitches and yaws. Implementing the algorithm on a cache-based CPU requires proper treatment on its memory access pattern, and chunk rendering was presented to handle this issue.

As will be understood by those of skill in the art, the above embodiments are merely illustrative of the invention, which is set forth in the following claims. The above description could be varied without departing from the scope of the invention. For example, other than linear interpolation could be used. Also, multiple arcs could be used. Accordingly, reference should be made to the following claims which set forth the scope of the invention.

What is claimed is:

1. A method for mapping an image express in cylindrical coordinates to a viewing plane, comprising:

mapping a top arc of a sampling region on a cylindrical image to a viewing plane;

mapping a bottom arc of said sampling region to said viewing plane; and interpolating vertically between said top and bottom arcs to obtain intermediate pixels on said viewing plane.

2. The method of claim 1 wherein said mapping steps comprise ray-tracing.

3. The method of claim 1 further comprising mapping additional arcs between said top and bottom arcs, and interpolating between each pair of arcs.

4. The method of claim 1 wherein said interpolating is linear interpolating.

5. The method of claim 1 further comprising:

performing the method of claim 1 on each portion of said image using chunk rendering, each said portion comprising a plurality of scan lines and being small enough to store said portion of said image in a cache memory.

6. A computer program product for mapping an image expressed in cylindrical coordinates to a viewing plane, stored on a computer readable storage media executable by a computer system, the computer program product comprising:

code for mapping a top arc of a sampling region on a cylindrical image to a viewing plane;

code for mapping a bottom arc of said sampling region to said viewing plane; and code for interpolating vertically between said top and bottom arcs to obtain intermediate pixels on said viewing plane.

7. The computer program product of claim 6 wherein said code for mapping instructions comprise code for ray-tracing.

8. The computer program product of claim 6 further comprising code for mapping additional arcs between said top and bottom arcs, and code for interpolating between each pair of arcs.

9. The computer program product of claim 6 wherein said interpolating is linear interpolating.

10. The computer program product of claim 6 further comprising instructions for:

code for performing the instructions of claim 6 on a portion of said image using chunk rendering, each said portion comprising a plurality of scan lines and being small enough to store said portion of said image in a cache memory.

* * * * *